United States Patent [19]

Sumida

[11] 3,921,129
[45] Nov. 18, 1975

[54] MALFUNCTION PREVENTIVE SYSTEM FOR USE IN AN AIR BAG INCORPORATING A SENSOR FOR DETECTING THE COLLISION SPEED OF A VEHICLE

[75] Inventor: Shizuo Sumida, Hiroshima, Japan

[73] Assignee: Toyo Kogyo Company, Limited, Hiroshima, Japan

[22] Filed: Mar. 14, 1973

[21] Appl. No.: 341,195

Related U.S. Application Data

[63] Continuation-in-part of Ser. No. 251,209, May 8, 1972, Pat. No. 3,830,329.

[30] Foreign Application Priority Data

| May 10, 1971 | Japan | 46-37234 |
| Mar. 18, 1972 | Japan | 47-27613 |
| Mar. 15, 1972 | Japan | 47-31230[U] |
| Mar. 15, 1972 | Japan | 47-31231[U] |
| Mar. 15, 1972 | Japan | 47-31232[U] |

[52] U.S. Cl. ............... 340/52 H; 180/91; 180/103; 280/150 AB; 340/61
[51] Int. Cl.² ........................................ B60R 21/08
[58] Field of Search .......... 340/52 R, 52 H, 61, 262; 180/91, 103, 104; 280/150 AB; 317/31, 33 R; 200/61.45 M

[56] References Cited
UNITED STATES PATENTS

| 3,035,520 | 5/1962 | Koeppen | 200/61.45 M |
| 3,585,453 | 6/1971 | Kawai | 317/31 |
| 3,601,655 | 8/1971 | Andersen | 340/52 H |
| 3,622,974 | 11/1971 | Best et al. | 340/52 H |
| 3,629,816 | 12/1971 | Gillund | 340/61 |
| 3,657,603 | 4/1972 | Adams | 317/31 |
| 3,703,300 | 11/1972 | Gillund et al. | 280/150 AB |
| 3,703,702 | 11/1972 | Arai | 340/52 R |
| 3,714,627 | 1/1973 | Dillman et al. | 340/52 H |
| 3,767,002 | 10/1973 | Gillund | 180/103 |
| 3,794,136 | 2/1974 | Okada | 180/91 |
| 3,848,695 | 11/1974 | Lacaze, Jr. | 180/103 |

*Primary Examiner*—John W. Caldwell
*Assistant Examiner*—Joseph E. Nowicki
*Attorney, Agent, or Firm*—Sughrue, Rothwell, Mion, Zinn, & Macpeak

[57] ABSTRACT

A malfunction preventive system for use in an air bag system which incorporates a sensor for detecting the collision speed of a vehicle, prevents the actuation of electrical circuits incorporated therein in case the sensor circuit and collision detecting means are not in normal conditions. This system further incorporates several other simulating and failure detecting means or circuits to detect the failures in several components associated therewith, thereby completely preventing the possibility of incurring a danger to human life and personal injury erroneous explosive inflation of an air bag, caused by the mal-function of failure in the system.

17 Claims, 2 Drawing Figures

MALFUNCTION PREVENTIVE SYSTEM FOR USE IN AN AIR BAG INCORPORATING A SENSOR FOR DETECTING THE COLLISION SPEED OF A VEHICLE

CROSS REFERENCE TO RELATED APPLICATIONS

This is a continuation-in-part application of Ser. No. 251,209 filed May 8, 1972, now U.S. Pat. No. 3,830,329.

BACKGROUND OF THE INVENTION

This invention relates to a malfunction preventive system for use in an air bag system incorporating a sensor for detecting the collision speed of a vehicle, and more particularly to a system incorporating circuits which prevent the erroneous explosive inflation of an air bag due to the failure in or malfunction of the system and which, at the same time, alarms or indicates to a driver beforehand the electrical failures in circuits or components incorporated therein with the aid of other several supplemental failure detecting means adapted to detect the malfunctions of the components of the system.

Hitherto, there have been proposed many systems, thereby to protect drivers from a danger to human life and personal injury at the time of collision of vehicles by providing an air bag system in which a rubbery air bag is adapted to be explosively inflated simultaneously with the collision of vehicles. However, if by any chance, such an air bag system fails to operate at the time of collision of vehicles or if such an air bag system erroneously operates in the normal or safe condition of a vehicle, the driver therein will be subjected to a danger of life or injury due to the malfunction of the air bag.

Accordingly, there remains the need to provide an air bag system which will absolutely operate only at the time of collision of vehicles and, at the same time, is designed not to operate when a vehicle runs in safe conditions.

It is an object of the invention to provide for a vehicle a malfunction preventive system for use in an air bag system, which prevents the erroneous explosive inflation of a bag that would be caused in the event of electrical failures in such an air bag system and which alarms such failures to a driver beforehand.

It is a further object of the invention to provide a malfunction preventive system for use in an air bag system incorporating a sensor adapted to detect the collision speed of the vehicle by means of a combination of coils and magnets.

It is a still further object of the invention to provide a malfunction preventive system for use in an air bag system, which completes a circuit including a priming plug and an electrical power source with a relay being designed to be actuated only when the coil is checked and proved to be in a normal condition by feeding a simulation signal thereto. It is a yet further object of the invention to provide a malfunction preventive system for use in an air bag system, which breaks the circuit of said plug and electrical power source in the event that a failure is caused in any portion of the system and which actuates a failure-indicating or alarming means.

It is a further object of the invention to provide a malfunction preventive system for use in an air bag system, which incorporates other supplemental failure detecting means such as for detecting failures in the circuit from a coil to a switch, short-circuiting of a G-sensor, failure in a pressure switch, incorrect position of a magnet, and short-circuiting or electrical disconnection of an ignition plug, and which in addition, incorporates a circuit which enables the operation of a buzzer or a lamp even if there is found a failure in a circuit of either of the buzzer and the lamp.

SUMMARY OF THE INVENTION

Briefly stated, the malfunction preventive system of the present invention primarily comprises a circuit consisting of a collision detecting portion ready to feed an output signal to actuate an ignition switch portion when a key switch is brought to a starting position; a relay connected via a fuse to an electrical power source; a first switching element adapted to be actuated by said output signal to said ignition switch and adapted to excite said relay to complete a circuit for an ignition plug and said ignition switch portion; and a second switching element provided in a circuit of said relay and adapted to actuate to blow said fuse in the event of failures each in said collision detecting portion, ignition switch portion, ignition plug and others, said collision detecting portion being adapted to complete a sensor circuit when said key switch is in an 'ON' position.

More particularly, according to the system of the present invention, said fuse is blown by means of the second switching element in the event that at least one of elements forming said sensor circuit fails, thereby breaking said relay circuit. Accordingly, in the event of the failure in the components of the sensor circuit, the relay will be prevented from actuation and the ignition plug will not be connected to the ignition switch portion, even when the collision detecting portion and the ignition switch portion are all found in normal conditions at the time of bringing said key switch to a starting position. In other words, when the key switch is turned ON and brought to a starting position, all elements constituting the sensor circuit can be checked for normal condition, and further only when all elements are found normal, the relay circuit may be completed with the fuse being maintained intact. In addition, only in the case that the collision detecting portion and ignition switch portion are proved to be in normal condition, the relay will be actuated to connect the ignition switch portion to the ignition plug. Still further in the case that at least one of the elements forming the sensor circuit is found to be in an abnormal condition, the ignition plug and ignition switch portion will not be connected to each other, thus improving the reliability of the operation of the system. In addition to this, since the ignition plug and ignition switch portion are adapted to be connected to each other only in case that the collision detecting portion and ignition switch portion are found to be in normal conditions, the erroneous explosive inflation of an air bag may be prevented.

According to another aspect of the system of the present invention, there are provided failure indicating or alarming means in addition to several supplemental failure detecting means such as for detecting a failure in a circuit from a coil to a switch, short-circuiting in a G-sensor, failure in a pressure switch, incorrect position of a magnet and short-circuiting or electrical disconnection in an ignition plug circuit.

DESCRIPTION OF THE PREFERRED EMBODIMENTS

Figure 1:
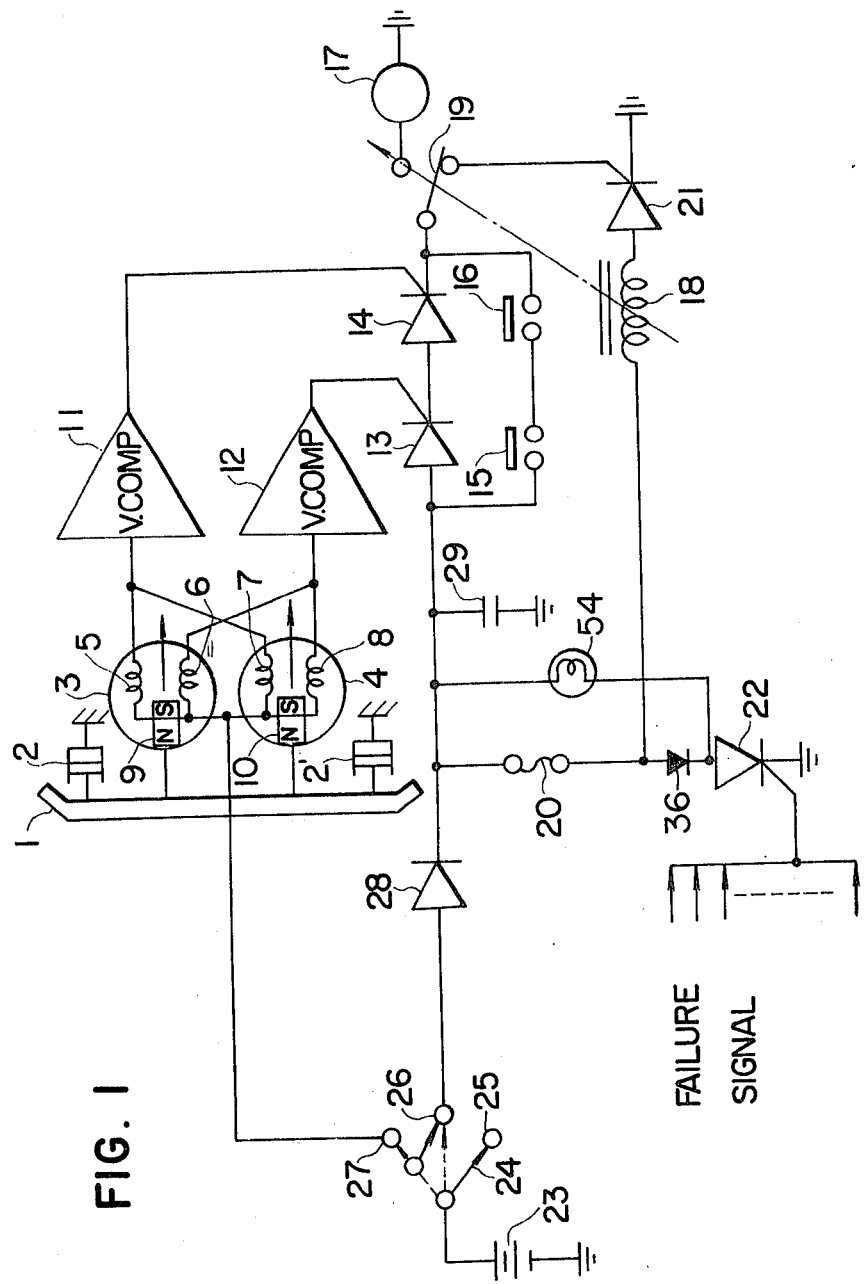
FIG. 1 is a electrical circuit diagram representing the fundamental construction of the mal-function preventive system of the invention.

Referring now to FIG. 1, there is shown an electrical circuit diagram embodying the fundamental principle of the present invention, in which, shown at 1 is a bumper of a vehicle, at 2, 2' dampers provided on said bumper on the opposite sides thereof, respectively, at 3, 4 sensing coil portions each consisting of coils 5, 6; 7,8 and permanent magnets 9, 10. The construction of each coil portion 3, 4 is taught in my co-pending application, Ser. No. 251,209 filed May 8, 1972, of which this application is a continuation-in-part, and such coil portions are provided on the bumper on opposite sides thereof. Designated by the reference numerals 11 and 12 are voltage comparators, while 13 and 14 represent thyristors whose gates are adapted to receive the outputs therefrom, respectively. The thyristors 13 and 14 are connected in series to each other. The collision detecting portion is composed of the voltage comparators 11 and 12, while the ignition switch portion is comprised of thyristors 13 and 14. The reference numerals 15 and 16 stand for deceleration sensors which will be referred to as G-sensors hereinafter and which are connected in series to each other and then connected in parallel to the series circuit of thyristors 13 and 14. Shown at 17 is an ignition plug which is connected via a contact 19 of a relay 18 to the output side of the thyristor 14. The relay 18 is connected in series to a fuse 20 and a thyristor 21. Shown at 22 is a thyristor whose gate is designed to receive a failure signal of the elements which constitute the sensor circuit. The actuation of the thyristor is designed to blow or break the fuse 20 to thereby open the relay circuit. Shown at 23 is an electrical power source and at 24 a key switch. Thus, when the key switch 24 is thrown to a contact 25, then each circuit as shown in FIG. 1 is brought to an 'OFF' position, and when the switch 24 is thrown to a contact 26, then the circuits comprised of condensor 29, thyristors 13 and 14 and fuse 20, relay 18, and thyristor 21 each respectively be connected to the electrical power source 23, while the circuit comprised of the fuse 20 and thyristor 22 will also be connected to the electrical power source 23. Furthermore, when the key switch 24 is brought into contact with the contact 27, then the sensing coil portions 3 and 4 will be connected to the electrical power source 23. (At this time, the key switch is also in contact with a contact 26.)

At the initial stage, the contacts 19 contact the gate side of the thyristor 21. When the key switch 24 is brought into contact with the contact 26, i.e., the key switch 24 is brought to an ON position, then the thyristor 13 will be connected via a diode 28 to the electrical power source 23, and the circuit comprised of the fuse 20 and relay 18 will be connected to the electrical power source 23, while the circuit comprised of the diode 28, fuse 20 and thyristor 22 will be connected to the electrical power source. At this time, as will be described with reference to FIG. 2, the circuits of each element constituting the sensor circuit will be completed, and each element is designed to issue a failure signal to the gate of the thyristor 22. Thus, when the key switch 24 is in an ON position, and yet in the event of the failure in at least one of elements constituting the sensor circuit, the output signal will be fed to the thyristor 22 to thereby bring the same in a conductive condition. In this manner, the fuse 20 will be grounded via thyristor 22 to thereby blow the fuse 20. For this reason, the relay 18 may not be excited, nor actuated even if the thyristor 21 is brought to a conductive condition. In case each element constituting the sensor circuit is in a normal condition, the failure signal will not be fed to the gate of the thyristor 22, nor will the fuse 20 be blown. Thus far, however, the thyristor 21 is in nonconductive condition.

Subsequently, when the key switch 24 is also brought into contact with the contact 27, i.e., to a starting position, (at this time, the key switch 24 also contacts the contact 26) then the sensing coil portions 3, 4 will be connected to the electrical power source 23, and a simulation signal will be fed thereto simultaneously with the starting of an engine (not shown). As will be described with reference to FIG. 2, there is provided a voltage divider on sensing coil portions 3 and 4. When the sensing coil portions 3 and 4 are both in normal conditions, the required simulation voltage from the voltage divider will be impressed to the voltage comparators 11 and 12 to cause the same to issue an output signal. However, in the event that either one of the sensing coils if subjected to short-circuiting to ground, there may not be obtained the desired output signal from the corresponding voltage divider, such that no output signal will be issued from one or the other of the voltage comparators. Although an output signal from the voltage comparators 11 and 12 is designed to be fed to the gates of the thyristor 13 and 14, the thyristors 13 and 14 will be brought to a conductive condition, only in case the comparators 11 and 12 issue an output signal, to thereby cause the voltage at the electrical source 23 to be applied to the gate of the thyristor 21, thus rendering the thyristor 21 in a conductive condition. At this time, if the fuse 20 is not blown, the electrical current will flow through the electrical power source 23 to the circuits of diode 28, fuse 20, relay 18 and thyristor 21, such that the relay 18 will be excited in a manner to switch the contact 19 to the side of the ignition plug 17.

Thus, when the key switch 24 is brought to an ON position and in turn to the starting position, yet only in case that the elements constituting the sensor circuit are all in normal conditions and that the collision detecting portion and ignition switch portion are in normal conditions, the relay 18 will be actuated to connect the ignition plug 17 to the ignition switch portion, while, in the case of the failure in at least one of the elements constituting the sensor circuit, the relay will not be actuated, resulting in disconnection of the ignition plug 17 from the ignition switch portion, such that the erroneous explosive inflation of an air bag may be prevented. In passing, even after the ignition plug 17 has been connected to the ignition portion, yet in the case of the failure of the ignition plug 17, or in the case of the failure in at least one of the elements constituting the sensor circuit, then the thyristor 22 will be actuated to blow or break the fuse 20 to discontinue the excitation of the relay 18, restoring the contact 19 to a position as shown in the drawing and then disconnecting the ignition plug 17 from the ignition switch portion. In this manner, the reliability of an air bag will be greatly enhanced.

Meanwhile, when any of elements constituting the sensor circuit is found to be in failure, it may be possible to notify a driver by using an alarm. The alarming means may be a buzzer or an indicating lamp.

Figure 2:
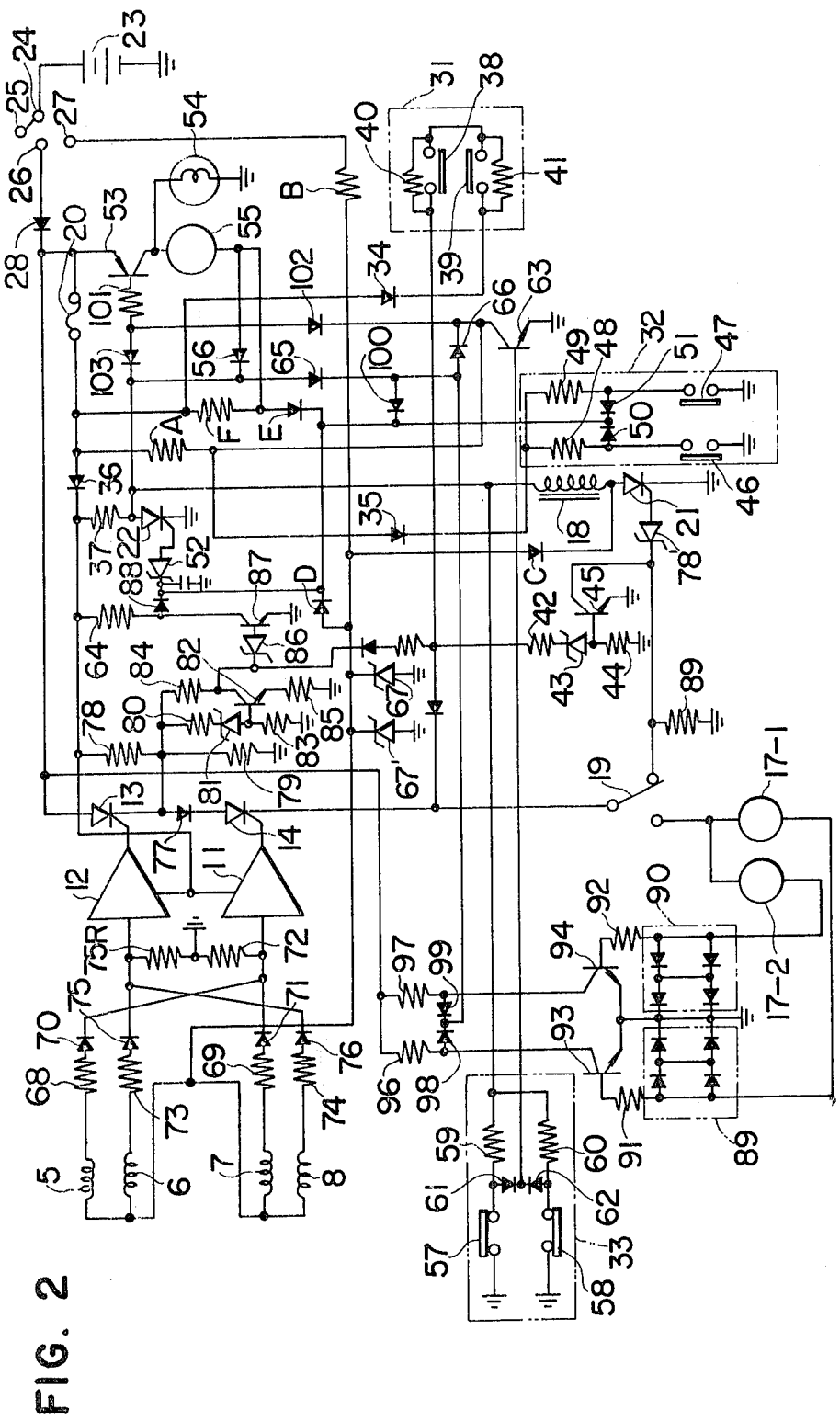
FIG. 2 is an electrical circuit diagram showing one embodiment of the invention.

Description will now be given to the operations of the components shown in FIG. 1 by referring to FIG. 2. FIG. 2 is an electrical circuit diagram showing one embodiment of the invention. Like numbers are used for the like parts throughout FIGS. 1 and 2.

Referring to FIG. 2, shown at 31 is a deceleration sensor (which will be referred to as G-sensor hereinafter), shown at 32 is pressure switch for use in a high-pressure bomb, and at 33 a bumper switch. When the key switch 24 is brought to an ON position, i.e., the key switch 24 is brought into contact with the contact 26, then the electrical power source 23 will be connected via fuse 20 and diode 34 to G-sensor 31, via diode 35 to the pressure switch 32 and via diode 36 and resistor 37 to the bumper switch 33, respectively. G-sensor 31 has two contacts 38 and 39 which are normally open and to which are connected in parallel the resistors 40 and 41 having a high level of resistance. This circuit is in turn connected via a resistor 42 to a zener diode 43, the zener diode 43 being held in a nonconductive condition due to the high level of resistance of the resistors 40 and 41. However, when the contacts 40 and 41 are closed due to any failure, then the resistors 40 and 41 will be short-circuited, such that the zener diode 43 will be brought to a conductive condition and the voltage will be impressed to the base of a transistor 45, thereby bringing the transistor 45 into a conductive condition. Furthermore, to provide for short-circuiting of the G-sensor, as will be described later, the key switch 24 is brought into contact with the contact 27, while a simulation signal will be fed via a resistor B to sensing coils 5, 6, 7 and 8. Accordingly, an output signal from the voltage comparators 11 and 12 will be fed to the gates of the thyristors 13 and 14 for conductive conditions. When the thyristors 13 and 14 are brought into conductive conditions, then a signal will be fed to the gate of the thyristor 21 to thereby excite the relay 18 to switch the contact 19, then bringing the thyristors 13 and 14 into non-conductive condition. However, it should be noted that, as has been referred to ealier, because of the transistor 45 being in a conductive condition, a signal will not be fed to the gate of the thyristor 21 even in the case of the thyristors 13 and 14 being in conductive conditions, and thus the contact 19 will not be switched. This will causes the thyristor 13 and 14 to maintain conductive conditions. Meanwhile, as will be described hereinafter, the transistor 87 is normally in a conductive condition, whereas, when the thyristors 13 and 14 are brought into conductive conditions, the diode 86 will be in non-conductive condition and thus the transistor 87 will become nonconductive. If the transistor 45 is in a conductive condition, then thyristors 13 and 14 will immediately be brought to non-conductive conditions. However, since the time period during which the transistor 87 is maintained in nonconductive condition is extremely short, the increased collector potential at the transistor 87 will not be applied to the gate of the thyristor 22, while, because of the transistor 45 being in a conductive condition, the transistor 87 will be maintained in non-conductive condition. It follows that the collector potential at the transistor 87 will be applied to the gate of the thyristor 22 to thereby render the thyristor 22 in a conductive condition, thereby blowing the fuse 20.

The contacts 46 and 47 arranged in parallel, of the pressure switch 32, are maintained closed when the pressure in a high-pressure bomb is in a normal condition. When it is connected to the electrical power source, the circuit consisting of the electrical power source 23, resistor A, diode 35, resistors 48 and 49, contacts 46 and 47 will be closed, with the input sides of the diodes 50 and 51 being grounded, resulting in no generation of voltage in the output sides of the diodes 50 and 51. On the other hand, when the pressure in the high-pressure bomb is lowered with the contacts 46 and 47 being open, a voltage will be impressed on the zener diode 52 in turn via the electrical power source 23, diode 35, resistors 48 and 49, and diodes 50 and 51, such that the zener diode 52 will be brought into a conductive condition, applying the voltage to the gate of the thyristor 22. This in turn renders the thyristor 22 in a conductive condition, such that the electrical current will flow through a circuit consisting of electrical power source 23, fuse 20, resistor 37 and thyristor 22, thereby blowing the fuse 20 while rendering the transistor 53 in a conductive condition. It follows then that the circuit consisting of electrical power source 23, transistor 53 and lamp 54 will be completed with the result lamp 54 is lighted, while the circuit consisting of electrical power source 23, transistor 53, buzzer 55, diode 56 and thyristor 22 will be closed, actuating the buzzer to give an alarm.

The contacts 57 and 58 of the bumper switch 33 are maintained closed while the permanent magnets 9 and 10 shown in FIG. 1 are in normal conditions with respect to the respective coils 5, 6; 7, 8. Accordingly, when the key switch 24 contacts the contact 26, as far as the bumper switch is maintained in a normal condition, the circuit consisting of electrical power source 23, fuse 20, diode 36, resistor 37, resistors 59, 60, and contacts 57 and 58 will be closed, with the input sides of the diodes 61 and 62 being grounded, resulting in no generation of voltage in the output sides of the diodes 61 and 62. If the positions of the permanent magnets 9 and 10 are in abnormal conditions and thus the contact 57 and 58 are open, then there will be applied a voltage to the output sides of the diodes 61 and 62, which voltage will in turn be applied to the base of the transistor 63, rendering the same in a conductive condition. The conductive condition of the transistor 63 causes the base of the transistor 53 to be grounded through resistor 101, diode 102, and transistor 63, thereby rendering the transistor 53 in a conductive condition, while lighting the lamp 54, completing the circuit consisting of transistor 53, buzzer 55, diode 56, diode 65, diode 66 and transistor 63, thus actuating the buzzer 55, and giving an alarm by means of the lamp 54 and buzzer 55. It should be noted that the fuse is maintained intact in this case.

Thus, when the key switch 24 is turned ON and then the pressure switch 32 is found to be in an abnormal condition, then the thyristor 22 will be actuated, blowing the fuse 20 and issuing an alarm. However, unless the pressure switch 32 is found to be in an abnormal condition, the thyristor will not be actuated, thus failing to blow the fuse. On the other hand, if any failure is experienced with the G-sensor 31, the fuse 20 will be blown.

In the event of the blown fuse accompanied by the resultant issue of an alarm, then a check should be given for the failure to restore the system to normal conditions.

The description will now be given to the failure such as of short-circuiting in the thyristors 13 and 14.

The voltage at the electrical power source 23 is divided via diode 36 at the resistors 78 and 79, and then applied via resistor 80 to zener diode 81, thereby maintaining the transistor 82 in a nonconductive condition. On the other hand, the voltage divided at the resistors 78 and 79 is applied via resistor 84 and zener diode 86 to the base of the transistor 87, rendering the transistor 87 in a conductive condition. In passing, the resistor 84 is also connected to the collector of the transistor 82. Shown at 83 and 85 are resistors. A voltage is applied from the electrical power source to the transistor 87 via fuse 20, diode 36, resistor 64. Connected to the collector of the transistor 87 via diode 88 is a zener diode 52 which tends to be brought to a conductive condition when the transistor 87 is in a conductive condition, such that no voltage will be applied via resistor 64 to the gate of the thyristor 22.

Provided that the thyristor 13 is short-circuited, when the key switch 24 is maintained in an ON position, the resistor 78 will be short-circuited with thyristor 13, with the result that the voltage to be applied to the zener diode 81 will be increased with the accompanied increase in the base potential of the transistor 82, thus bringing the transistor 82 in a conductive condition. It follows that the collector potential of the transistor 82 will be lowered with the lowered potential being applied to the zener diode 86, thereby rendering the zener diode in nonconductive condition, nullifying the base potential of the transistor 87, and resulting in nonconductive condition in the transistor 87. This then leads to an increase in voltage to be applied to the zener diode 52, thus rendering the zener diode 52 in a conductive condition, such that the voltage will be applied via electrical power source 23, fuse 20, diode 36, resistor 64 and diode 88 to the gate of the thyristor 22 to thereby render the thyristor 22 in a conductive condition, with the resultant blowing of the fuse 20. At this time, the transistor 53 will be brought to a conductive condition with the base thereof grounded via resistor 101, diode 103 and thyristor 22, thereby giving an alarm by means of the lamp 54 and buzzer 55.

When the thyristor 14 is short-circuited, the voltage dividing point between the resistors 78 and 79 is grounded via diode 77, thyristor 14, contact 19 and resistor 89, with the resultant decrease in the divider voltage. Accordingly, the voltage to be applied to the zener diode 86 via the resistor 84 will be lowered, thereby rendering the zener diode 86 in a nonconductive condition, while nullifying the base voltage of the transistor 87. This causes the transistor 87 to be in a nonconductive condition, rendering the zener diode 52 and the thyristor 22 in conductive conditions, thereby blowing the fuse 20 and issuing an alarm by means of the lamp 54 and buzzer 55.

If the elements 13, 14, 31 and 33 are in normal conditions, then there will result no blowing of the fuse, nor issuing of an alarm, such that the key switch 24 will be brought to a starting position to contact with the contact 27, thereby starting an engine. At this time, the voltage at the electrical power source 23 is maintained to a predetermined value through resistor B and by means of zener diodes 67 and 67' and then impressed as a simulation signal to the sensing coils 5, 6, 7 and 8 in the collision detecting portion. The sensing coils 5 and 7 are connected via resistors 68 and 69 and diodes 70 and 71 to the resistor 72 and voltage comparator 11, respectively. The voltage divider consists of resistors 68, 69 and 72. On the other hand, the sensing coils 6 and 8 are connected via resistors 73, 74, diodes 75 and 76 to the resistor 75 R and voltage comparator 12. The voltage divider is composed of resistors 73, 74 and 75R. When the key switch 24 also contacts the contact 27 and when the coils 5, 6, 7 and 8 are each connected via resistor B to the electrical power source 23, yet if the coils 5, 6, 7 and 8 are all in normal conditions, the predetermined voltage from the voltage divider consisting of resistors 68, 69 and 72 will be applied to the voltage comparator 11, whereupon an output signal will be fed from the voltage comparator 11 to the gate of the thyristor 14, thus bringing the same in a conductive condition. However, in case at least one of the coils 5 and 7 is disconnected or grounded, the voltage to be applied from the divider consisting of the resistors 68, 69 and 72 to the voltage comparator will be lower than the predetermined value, at which value an output signal is designed to be issued from the voltage comparator. Accordingly, no signal will be fed to the gate of the thyristor 14, thus failing to render the same in a conductive condition.

The reasons for this are as follows:

Assuming the resistance of resistors 68 and 69 being $R_1$, the resistance of the resistor 72 being $R_2$ and the voltage of Eo which has been made constant by means of a diode 67, the divisional voltage E to be applied to the comparator in case the coils 6 and 7 are both in normal conditions, will be expressed as follows:

$$E = \frac{R_2}{\frac{1}{2}R_1 + R_2} Eo$$

and the divisional voltage E' to be applied to the comparator 11, in case one of coils 5 and 7 is disconnected, will be as below;

$$E' = \frac{R_2}{R_1 + R_2} Eo$$

wherein E' is smaller than E. The comparator is designed to issue an output signal when the voltage E is applied thereto, whereas it will not issue an output signal when the voltage E' is applied.

Likewise, in the case that the coils 6 and 8 are both in normal conditions and when the key switch contacts the contact 27, an output signal will be issued from the comparator 12 to the gate of the thyristor 13, thus rendering the thyristor 13 in a conductive condition. On the other hand, when at least one of coils 6 and 8 is disconnected or short-circuited to ground, there will not be generated any output signal from the comparator 12 and thus the thyristor 13 will not be in a conductive condition.

As is apparent from the foregoing, when the coils 5, 6, 7 and 8 are all in normal conditions, the thyristors 13 and 14 will be brought into a conductive condition, whereas in case either one of the coils 5 and 8 is disconnected or short-circuited to the ground, then at least one of the thyristors 13 and 14 will not be brought to a conductive condition. The thyristors 13 and 14 as well as a diode 77 are connected in series to each other, and when both thyristors are brought in a conductive condition, then the gate of the thyristor 21 will be connected via contact 19 and zener diode 78' to the electrical power source 23 to thereby render the thyristor 21 in a conductive condition. However, in case either one of the thyristors 13 and 14 is in non-conductive condition, the voltage will not be applied to the gate of the thyristor 21. When the voltage is applied to the gate of the thyristor 21 to render the same conductive, then the circuit consisting of the electrical power source 23, fuse 20, diode 36, resistor 37, relay 18 and thyristor 21 will be completed, causing the electrical current to flow through the relay 18, whereby the relay 18 will be actuated to switch the contact 19 to the side of ignition plugs 17 - 1 and 17 - 2. In this manner, the ignition plugs 17 - 1 and 17 - 2 are connected to the circuit of the thyristors 13 and 14.

Simultaneously therewith, the simulation signal will be grounded via electrical power source 23, resistor B, diode C and thyristor 21, such that the erroneous explosive inflation of an air bag due to a electrical failure will be prevented. Alternatively, the means to prevent such erroneous explosive inflation of an air bag by using a simulator may be a switching means adapted to disconnect the electrical power source from coils. In case that either one of sensing coils 5, 6, 7 and 8, voltage comparators 11 and 12, thyristors 13 and 14 is in failure and yet in case that the thyristor 21 is not brought into a conductive condition by a simulation signal, then the thyristor 22 will be brought into a conductive condition through electrical power source 23, resistor B, diode D, and zener diode 52, thereby blowing the fuse 20, while actuating the lamp 54 and buzzer 55. In case the ignition plugs 17 - 1 and 17 - 2 are both in normal conditions, there will be generated a forward voltage drop in each of diode groups 89 and 90, and then such a voltage will be applied to the bases of the transistors 93 and 94, respectively, to thereby render the transistors 93 and 94 in conductive conditions. Thus, the circuit consisting of the electrical power source 23, resistors 96 and 97 will be grounded via transistors 93 and 94. Provided that one of ignition plugs 17 - 1 and 17 - 2 is disconnected, there will not result a forward voltage drop in diode group 89 or 90. As a result, the transistor 93 or 94 is brought into a conductive condition and the voltage will be applied via resistor 96 or 97 and diode 98 or 99 and through a diode 100 to the zener diode 52, such that the thyristor 22 will be brought into a conductive condition, thereby blowing the fuse 20. This causes the relay 18 to open and then the switch 19 will be restored to the condition as shown in the drawings, while the ignition plugs 17 - 1 and 17 - 2 will be disconnected from the ignition switch portion.

Meanwhile, in the event of the failure being encountered with either one of the elements constituting the sensor circuit, after the contact 19 has been switched to the side of ignition plugs 17 - 1 and 17 - 2 and the ignition plugs have been connected with the ignition switch portion, then the thyristor 22 will be actuated, as is clear from the foregoing description, to thereby blow the fuse 20 and give an alarm.

Although not shown in the drawings, there is provided a transformer between the gates of the thyristors 13/14 and the voltage comparators 11/12. When there is generated an output on the voltage comparators 11 and 12, such an output is so desigened as to be taken out of the secondary side of the transformer and fed to the gates of the thyristors 13 and 14. The thyristors 21 and 22 need not necessarily be provided may be replaced by other switching elements such as transistors.

In addition, it is so designed that the relay 18 has a self-sustaining circuit (not shown) and will maintain excitation until the fuse 20 has been blown by the actuation of the thyristor 22, and that the blowing of the fuse 20 by means of the actuation of the thyristor 22 will break the excitation to thereby restore the contact 19 to a position as shown in the drawings.

Turning now to the means to automatically actuate either one of the buzzer 55 and lamp 54 in case that one of the circuits thereof is disconnected, the disconnection detecting means consists of a circuit adapted to feed a signal via electrical power source 23, resistor F, diode E to the zener diode 52 as well as the gate of the thyristor 22; and a circuit comprised of electrical power source 23, fuse 20, resistor F, buzzer 55 and lamp 54. The resistance of the resistor F is set to a value considerably higher than the resistances of the lamp and buzzer, such that the voltage at the connection of diode E and resistor F will extremely be low. If either one of the circuits of the lamp 54 and buzzer 55 is disconnected, then the voltage at the aforesaid connection will be raised and impressed via the disconnection detecting means to the thyristor 22 to thereby render the same conductive, while in turn bringing the transistor 53 in a conductive condition, thus rendering conductive the other one of the circuits which is not disconnected. Simultaneously therewith, the fuse 20 will be blown due to the thyristor 22 being in a conductive condition.

In passing the G-sensor 31 is provided as a supplemental means in this embodiment and thus may not be provided, as the case may be.

According to the present invention, the collision detecting portion and the ignition switch portion are provided in a dual construction, such that even when one of the bumpers in the collision detecting portion is deformed due to the collision, electromotive forces of the same level will be generated in coils 5 and 6 or coils 7 and 8, whereby the voltage comparators 11 and 12 will issue an output signal to actuate the ignition plugs 17 - 1 and 17 - 2 with the resultant appreciably improved reliability. However, in the event that either one pair of the coils 5, 6 and coils 7, 8 generates an electromotive force due to a factor such as noise, there will be generated an output only in either one of the voltage comparators 11 and 12, such that either one of the thryistors 13 and 14 will be brought in a conductive condition, thus causing the ignition plugs 17 - 1 and 17 - 2 to fail to effect the ignition. Accordingly, this will greatly improve the performance of the system by preventing the erroneous explosive inflation of an air bag due to the malfunctioning of the system. Furthermore, failures encountered with each element constituting the sensor circuit may be checked by turning the key switch ON, and hence, in the event of a failure, the thyristor 22 will be actuated to blow the fuse 20, while disconnecting each element from the electrical power source. Alternatively, however, it may be possible that the relay 18 is put into a condition which may prevent its actuation, while permitting the issue of an alarm. Furthermore, even after all elements have been checked and proved for their normal condition and then the ignition plug has been connected to the ignition switch portion by means of the actuation of the relay 18, if a failure is encountered with the elements constituting the sensor circuit, then the thyristor 22 will be actuated, blowing the fuse 20, disconnecting each element from the electrical power source, releasing the relay 18 from excitation and disconnecting the ignition plug from the ignition switch portion. However, these operations or actuations can be achieved for a very short period of time immediately after the occurrence of a failure in the sensor-constituting elements, thereby greatly improving the reliability of preventing the erroneous explosive inflation of an air bag.

The detailed description of the elements and components with respect to their operation at the time of the collision of vehicles are well known and thus omitted herein.

While the present invention has been described herein with reference to certain exemplary embodiments thereof, it should be understood that various changes, modifications, and alterations may be effected without departing from the spirit and the scope of the present invention, as defined in the appended claims.

What is claimed is:

1. A malfunction preventive system for use in an air bag system of a vehicle, comprising:
   an electrical power source;
   an electrical sensor means for detecting a collision speed of said vehicle and consisting of a combination of a coil and a magnet and generating a collision signal at the time of detecting the collision speed of said vehicle;
   a priming or ignition plug for actuating an air bag;
   a first switching means connected to the coil of said electrical sensor means and adapted to be brought to an ON position in response to the collision signal from said electrical sensor means, said first switching means being connected between said plug and power electrical power source;
   failure detecting means adapted to detect failures in at least said electrical sensor means, said priming or ignition plug, and said first switching means and to generate a failure signal;
   a relay, said relay, said first switching means, said plug, and said electrical power source being connected in series, said relay being adapted to electrically disconnect said plug from said electrical power source in response to the failure signal fed from said failure detecting means; and
   indicating or alarming means connected to said electrical power source and adapted to be actuated in response to a failure signal fed from said failure detecting means, whereby, In case of said failure detecting means detecting failures, said relay electrically disconnects said electrical power source and said plug, and simultaneously said indicating or alarming means is actuated.

2. A malfunction preventive system as defined in claim 1, wherein said system further comprises a simulation means for generating a simulation signal, and a key switch having OFF, ON and START positions, said simulation means being connected to said START position of said key switch and to said coil, and said START position being provided for driving a starter motor of an engine, whereby said simulation means may feed the simulation signal to said coil at the time of starting said engine.

3. A malfunction preventive system as defined in claim 2, wherein said relay is adapted to connect said plug with said electrical power source in response to said simulation signal.

4. A malfunction preventive system as defined in claim 3, wherein said simulation means includes means for stopping the feeding of said simulation signal by said relay after said plug has been connected with said electrical power source.

5. A malfunction preventive system as defined in claim 1, wherein said first switching means includes two switching elements connected in series.

6. A malfunction preventive system for use in an air bag system incorporating a sensor for detecting a collision speed of a vehicle, comprising:
   an electrical power source;
   a fuse;
   an electrical sensor means for generating a collision signal and consisting of a coil and a magnet;
   a priming or ignition plug adapted to actute said air bag;
   a first switching means connected to said coil of said electrical sensor means and adapted to be turned ON in response to said collision signal from said electrical sensor means;
   a relay having a switching device with ON and OFF positions, said switching device being connected in series with said electrical power source, said first switching means and said plug and operative to turn ON or OFF the electrical connection of said plug with said first switching means, and an electric magnet adapted to bring said switching device to the ON position, said electric magnet of said relay being connected via said fuse to said electrical power source;
   a failure detecting means for detecting failures in at least said electrical sensor means, said priming or ignition means, and said first switching means and generating a failure signal;
   a second switching means adapted to be actuated in response to said failure signal from said failure detecting means, whereby said fuse will be blown when said second switching means is activated;
   a simulation means adapted to feed a simulation signal similar to said collision signal to said coil of said electrical sensor means, prior to the starting of said vehicle; and
   a third switching means adapted to be actuated in response to said simulation signal and forming a circuit by being connected via said fuse and said electric magnet of said relay to said electrical power source.

7. A malfunction preventive system as defined in claim 1, wherein said indicating or alarming means consists of:
   a lamp (54) having two terminals, one of which is grounded and the other of which is ungrounded;
   a buzzer (55) having two terminals;
   a resistor (F) connected to one of said two terminals of said buzzer (55);
   a fuse (20), said buzzer, resistor and fuse being connected in series via a contact (26) to said electrical power source (23);
   a transistor (53) whose emitter is connected to said contact (26) and whose collector is connected to the other of said two terminals of said buzzer and to the ungrounded terminal of said lamp;
   a diode (E) connected to the same terminal of said buzzer as said resistor; and
   a second switching means (22) having a gate which is connected to said diode (E), said second switching means being connected to the base of said transistor.

8. A malfunction preventive system as defined in claim 1, wherein said failure detecting means includes means for detecting a failure in the circuit from said coil to said first switching means.

9. A malfunction preventive system as defined in claim 8, wherein said first switching means includes two gated switching elements and said detecting means for detecting failure in the circuit from said coil to said first switching means, consists of:
   two sensing coil portions (3 and 4) each having a pair of coils (5, 6 and 7, 8), said coils being connected in common at one terminal each thereof to a contact (27) of a key switch, corresponding ones in each of said pair of coils being connected to each other; and
   two voltage comparators (11 and 12) whose outputs are connected to gate said two switching elements (13 and 14).

10. A malfunction preventive system as defined in claim 1, further including a G-sensor connected in parallel with said first switching means and wherein said failure detecting means includes means for detecting short-circuiting in said G-sensor.

11. A malfunction preventive system as defined in claim 1, further including means for inflating said air bag, including a pressure switch and wherein said failure detecting means includes means for detecting failure in said pressure switch.

12. A malfunction preventive system as defined in claim 1, wherein said failure detecting means includes means for detecting incorrect position of said magnet.

13. A malfunction preventive system as defined in claim 10, wherein said G-sensor includes input and output terminals and two contacts (38 and 39) which are open in normal conditions and two resistors (40 and 41) connected in parallel to said contacts, respectively, said detecting means comprising:
   a contact (26) connected via a fuse (20) to the input terminal of said G-sensor;
   a switching element having a gate electrode, said switching element being (21) connected to said relay; and
   a transistor (45) whose base is connected to the output terminal of said G-sensor and whose collector is connected to the gate electrode of said switching element (21) and whose emitter is connected to ground.

14. A malfunction preventive system as defined in claim 11, wherein said pressure switch (32) includes input and output terminals, and wherein said detecting means comprises:
   a fuse connected in series with said electrical power source and said input terminal of said pressure switch; and
   a second switching means (22) whose gate is connected to the output terminal of said pressure switch, said second switching means being connected via said fuse (20) to said electrical power source.

15. A malfunction preventive system as defined in claim 12, wherein said failure detecting means for detecting an incorrect position of a magnet, consists of:
   a key switch;
   a fuse;
   two magnets;
   a bumper switching means (33) having input and output terminals and two contacts (58 and 57) normally connecting said output terminal to ground and adapted to open in the event of an incorrect position of said magnets, while the input terminal of said bumper switching means is connected via said fuse (20) and a contact (25) of said key switch (24) to said electrical power source (23);
   a first transistor (63) whose base is connected to the output terminal of said bumper switching means (33) and whose emitter is grounded; and
   a second transistor (53) whose base is connected to the collector of said first transistor, said second transistor being connected to switch said indicating means.

16. A malfunction preventive system as defined in claim 1, wherein said failure detecting means includes means for detecting shortcircuiting or open-circuiting of said ignition plug.

17. A malfunction preventive system as defined in claim 1, further including a G-sensor connected in parallel with said first switching means, means for inflating said air bag including a pressure switch, and wherein said failure detecting means includes means for detecting a failure in the circuit from said coil to said first switching means, means for detecting short-circuiting in said G-sensor, means for detecting failure in said pressure switch, means for detecting incorrect position of said magnet, and means for detecting short-circuiting or open-circuiting of said ignition plug.

* * * * *